Oct. 5, 1965   ICHIRO SONODA ETAL   3,210,579
APPARATUS FOR GENERATING VIBRATION
Filed Dec. 17, 1962                            3 Sheets-Sheet 1

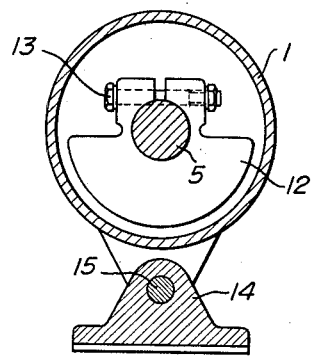
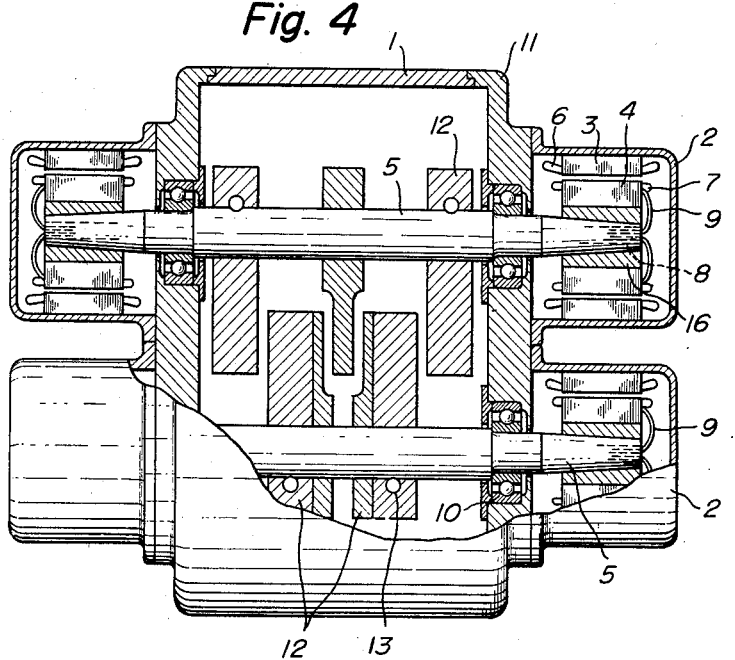

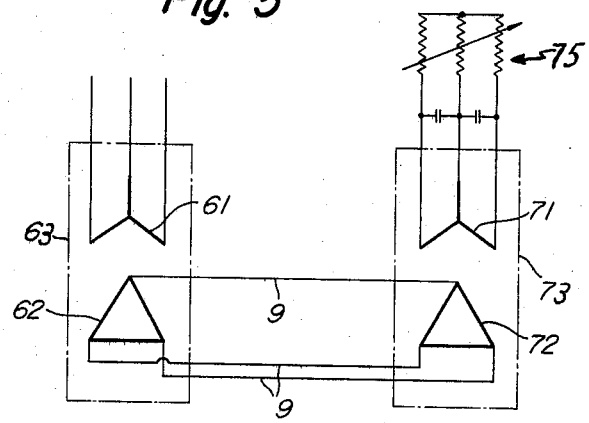

United States Patent Office

3,210,579
Patented Oct. 5, 1965

3,210,579
APPARATUS FOR GENERATING VIBRATION
Ichiro Sonoda and Tetsuichiro Nakashima, Yawata-shi, Japan, assignors to Yaskawa Electric Mfg. Co. Ltd., Yawata-shi, Japan, a corporation of Japan
Filed Dec. 17, 1962, Ser. No. 245,069
Claims priority, application Japan, Dec. 18, 1961, 36/46,262
3 Claims. (Cl. 310—81)

The present invention relates to apparatus for generating vibration of the type which includes an electric motor having a drive shaft on which an unbalanced mass is mounted to generate vibration when rotated with the drive shaft.

Conventionally, an apparatus for generating vibration of the type described employs a squirrel-cage type induction motor and requires a relatively large supply of electric power because this type of induction motor requires a large starting current particularly when the apparatus has a large capacity. On the other hand, the power source customarily employed in building sites has only a limited capacity and, therefore, any vibratory pile-driving apparatus of substantial capacity cannot be employed because of the limited power supply available for the pile-driving purpose.

In view of the above, the use of a wound-rotor induction motor is recommendable to provide for a limited starting current. However, this type of motor usually includes a slip ring and brushes and when employed in an apparatus for generating vibration of the kind described is often subject to various failures since the apparatus itself is subject to substantial vibration and in most cases is employed in places where the maintenance of the apparatus is rather difficult, for example in building sites for pile driving purposes. Under these circumstances, it is difficult to maintain the slip ring and brushes of the motor in satisfactory operating condition, as will readily be understood.

To overcome these difficulties the present invention has as an object to employ wound-motor induction motors associated with each other in a manner so as to eliminate the need of employing a slip ring and brushes on either machine.

The present invention will now be described with reference to the accompanying drawings, which illustrate a few preferred embodiments of the invention and in which:

FIG. 2 is a cross section taken along the line A—A in FIG. 1;

FIG. 4 is a cross section taken along the line B—B in FIG. 3; and

FIG. 5 is an electrical circuit diagram showing the preferred connecting arrangement for the motors on the common shafts.

Figure 1:
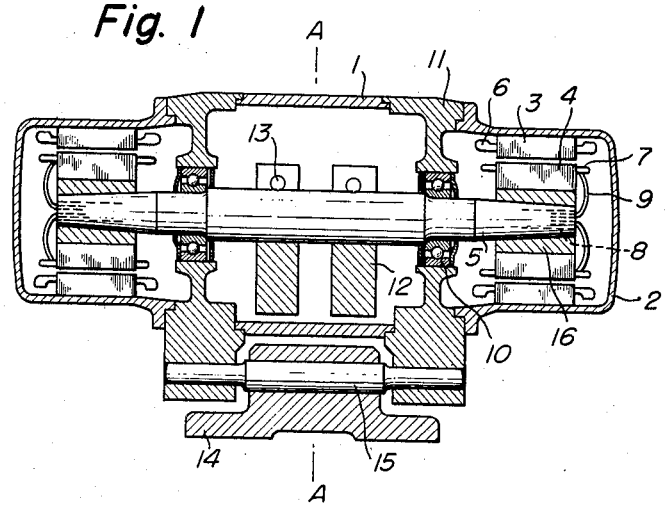
FIG. 1 is a cross-sectional side elevation of one embodiment of the invention.

Referring now to the drawings in detail, wherein like reference characters indicate like parts throughout the several figures, the reference numeral 1 indicates a casing of the apparatus carrying motor housing 2 on opposite sides thereof through the intermediary of respective bearing support frames 11. Each of the motor housings 2 accommodates stator cores 3 fixed relative to the housing 2, rotor cores 4, a rotary shaft 5, stator windings 6 on stator cores 3, and rotor windings 7 on rotor cores 4, as shown clearly in FIGS. 1 and 4. The rotary shaft 5 has an axial bore 8 extending therethrough for receiving connecting wires 9 and supported by spaced bearings 10 mounted in the respective bearing support frames 11.

Rotor cores 4 are mounted on the rotary shaft 5 at opposite ends thereof by way of nonmagnetic members 16, rotor windings 7 mounted on respective rotor cores 4 at one end of the shaft being connected by wires 9 with rotor windings 7 on the rotor cores at the other end of the shaft.

An unbalanced mass 12 is secured to the rotary shaft 5 intermediate its ends by fastening screws 13. The unbalanced mass may be divided into a desired number of separate pieces, for example, two pieces as illustrated. Secured to each of the motor housings 2 are stator cores 3 carrying respective stator windings 6 in spaced opposite relation to the rotor cores 4. The stator windings 6 in one motor housing, i.e., one end of the common housing or casing 1 are connected to an appropriate source of power while the stator windings in the other motor housing are connected to a secondary resistance 75 (FIG. 5) not shown. The rotor cores, rotor windings, stator cores, and stator windings all housed in each of the motor housings 2 constitute a wound-rotor induction motor, as will be readily understood. A machine base 14 is connected to the support frames 11 by way of a pivotal support shaft 15, as shown.

In FIG. 5, two motors 63 and 73, disposed on a common shaft, are shown with their rotor windings 62 and 72 respectively interconnected by plural leads 9. Motor 63 has its stator 61 adapted for connection to an external source (not shown). Stator 71 of motor 73 has its windings connected to an adjustable secondary resistance 75, as illustrated. The foregoing arrangement enables the disposing of slip rings and brushes, because of the inductive coupling arrangement.

With this construction, including two aligned wound-rotor induction motors mounted on a common rotary shaft and an unbalanced mass carried by the rotary shaft, the rotation of the rotary shaft generates vibration, which is transmitted through pivotal support shaft 15 to the machine base 14 to impart vertical vibration thereto. In addition, since the two wound-rotor induction motors mounted on a common shaft have their rotor windings connected with each other and the stator windings of one induction motor is connected with a source of power supply with those of the other induction motor connected to a secondary resistance, as described above, the two motors cooperate with each other as a single wound-rotor induction motor having a pole number of $P_1+P_2$, $P_1$ and $P_2$ representing the pole numbers of the respective induction motors on opposite sides of the apparatus, thus dispensing with any slip ring or brushes.

Figure 3:
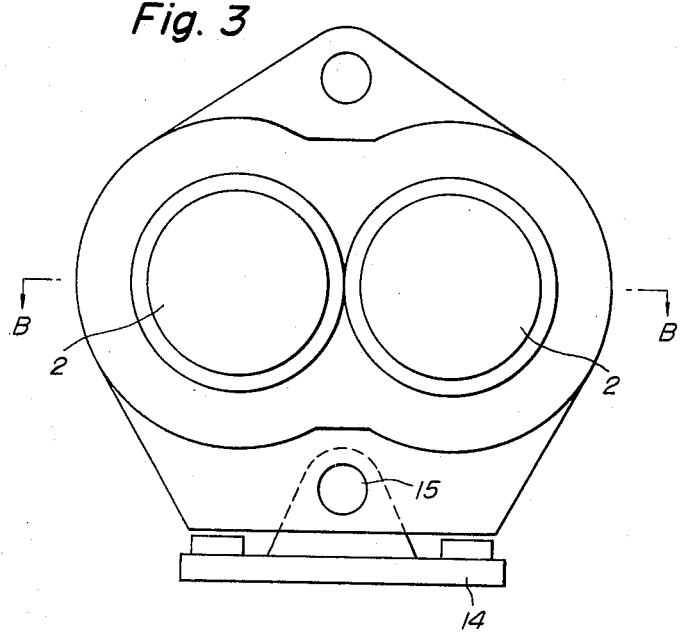
FIG. 3 is a front elevation of another embodiment of the invention.

The embodiment shown in FIGS. 3 and 4 includes two rotary shafts in a common casing in parallel to each other each carrying two wound-rotor induction motors at opposite ends and an unbalanced mass intermediate the ends of the shaft and adapted to rotate in opposite directions for the purpose of obtaining an improved synchronizing effect.

It will be appreciated from the foregoing that the apparatus employing two wound-rotor induction motors according to the present invention is very advantageous in practical applications as it requires no slip ring nor brushes thereby facilitating its maintenance and fully withstands vibration, to which it is subjected, while requiring only a limited starting current.

What is claimed is:

1. An apparatus for generating vibration comprising a shaft, two wound-rotor induction motors mounted on said shaft substantially at opposite ends thereof, whereby said shaft serves as a common rotor shaft for said two induction motors, an unbalanced mass secured to said shaft, electrical connections connecting the rotor windings of said two induction motors with each other respectively, further connections extending from the stator windings of one of said two induction motors for connection to a source of power supply, secondary resistance means, and means connecting the stator of the other of said motors across said resistance means.

2. The device of claim 1 comprising two shafts each having the structure connected according to claim 1, a common casing, said shafts being mounted in parallel relation within said casing, and means for imparting rotation to the shafts in opposite directions through connections of said stators to a source of power supply.

3. The apparatus as claimed in claim 1 wherein said mass comprises a plurality of separate spaced apart pieces secured to said shaft.

References Cited by the Examiner
UNITED STATES PATENTS

| | | | |
|---|---|---|---|
| 2,235,183 | 3/41 | Wettlaufer | 310—81 |
| 2,432,982 | 12/47 | Braddon et al. | 310—68.4 |
| 2,857,535 | 10/58 | Kroeckel et al. | 310—81 |
| 3,114,094 | 12/63 | Lee | 318—533 |

MILTON O. HIRSHFIELD, *Primary Examiner.*